US011307073B2

(12) United States Patent
Tainoff et al.

(10) Patent No.: US 11,307,073 B2
(45) Date of Patent: Apr. 19, 2022

(54) DEVICE FOR MEASURING SPEED OR FLOW OF GAS

(71) Applicant: CENTRE NATIONAL DE LA RECHERCHE SCIENTIFIQUE, Paris (FR)

(72) Inventors: Dimitri Tainoff, Grenoble (FR); Olivier Bourgeois, Saint Laurent du Pont (FR)

(73) Assignee: CENTRE NATIONAL DE LA RECHERCHE SCIENTIFIQUE, Paris (FR)

(*) Notice: Subject to any disclaimer, the term of this patent is extended or adjusted under 35 U.S.C. 154(b) by 90 days.

(21) Appl. No.: 16/606,190

(22) PCT Filed: Apr. 18, 2018

(86) PCT No.: PCT/EP2018/059817
§ 371 (c)(1),
(2) Date: Oct. 17, 2019

(87) PCT Pub. No.: WO2018/192934
PCT Pub. Date: Oct. 25, 2018

(65) Prior Publication Data
US 2020/0124450 A1    Apr. 23, 2020

(30) Foreign Application Priority Data
Apr. 18, 2017    (FR) ...................................... 1753342

(51) Int. Cl.
*G01F 1/688*    (2006.01)
*G01F 1/696*    (2006.01)
*G01F 25/00*    (2022.01)

(52) U.S. Cl.
CPC .......... *G01F 1/6888* (2013.01); *G01F 1/6965* (2013.01); *G01F 25/0053* (2013.01)

(58) Field of Classification Search
CPC ... G01F 1/6888; G01F 1/6965; G01F 25/0053
See application file for complete search history.

(56) References Cited

U.S. PATENT DOCUMENTS 4,561,303 A * 12/1985 McCarthy ............. G01F 1/6888
136/222
5,231,877 A    8/1993 Henderson et al.
(Continued)

FOREIGN PATENT DOCUMENTS

AU    2914971 A    11/1972
CN    1793791 A    6/2006
(Continued)

OTHER PUBLICATIONS

French Search Report and Written Opinion from French Patent Application No. 1753342, dated Mar. 15, 2018 (7 pages).
(Continued)

*Primary Examiner* — Justin N Olamit
(74) *Attorney, Agent, or Firm* — Greer, Burns & Crain, Ltd (57) ABSTRACT

A device for measuring the speed or flow of a gas at a temperature different from an ambient temperature is provided, which includes: a first platform suspended by first arms above a support designed to be kept at an ambient temperature, the first arms comprising thermoelectric strips designed to supply a first voltage based on the difference between the temperatures of the first platform and the support; and a processing unit designed to supply the speed or flow measurement on the basis of the first voltage, the gas temperature and the ambient temperature.

16 Claims, 4 Drawing Sheets

(56) References Cited

U.S. PATENT DOCUMENTS

| | | | |
|---|---|---|---|
| 5,406,841 A | 4/1995 | Kimura | |
| 5,852,239 A * | 12/1998 | Sato | G01F 1/6845 |
| | | | 73/204.26 |
| 6,131,453 A | 10/2000 | Sultan et al. | |
| 6,662,121 B1 * | 12/2003 | Oda | G01N 25/18 |
| | | | 702/45 |
| 6,871,538 B2 * | 3/2005 | Fujiwara | G01F 1/6965 |
| | | | 73/204.26 |
| 7,399,118 B2 | 7/2008 | Matter et al. | |
| 8,286,478 B2 * | 10/2012 | Speldrich | G01F 1/692 |
| | | | 73/204.23 |
| 8,943,887 B2 * | 2/2015 | Gerhardt | G01N 30/32 |
| | | | 73/204.11 |

FOREIGN PATENT DOCUMENTS

| | | | |
|---|---|---|---|
| CN | 101738230 A | | 6/2010 |
| JP | 5978963 B2 | * | 8/2016 |
| WO | 2004003483 A1 | | 1/2004 |

OTHER PUBLICATIONS

English Translation of the PCT International Search Report and Written Opinion for PCT Application No. PCT/EP2018/059817 dated Aug. 1, 2018 (10 pages).

* cited by examiner

Fig 1

PRIOR ART

DEVICE FOR MEASURING SPEED OR FLOW OF GAS

BACKGROUND

The present application relates to a measuring instrument, in particular a device for measuring the velocity or flow of a gas.

In various industrial systems, or for example in heating or air-conditioning devices, the velocity or flow of a gas needs to be measured. The gas circulates for example in pipework.

Figure 1:
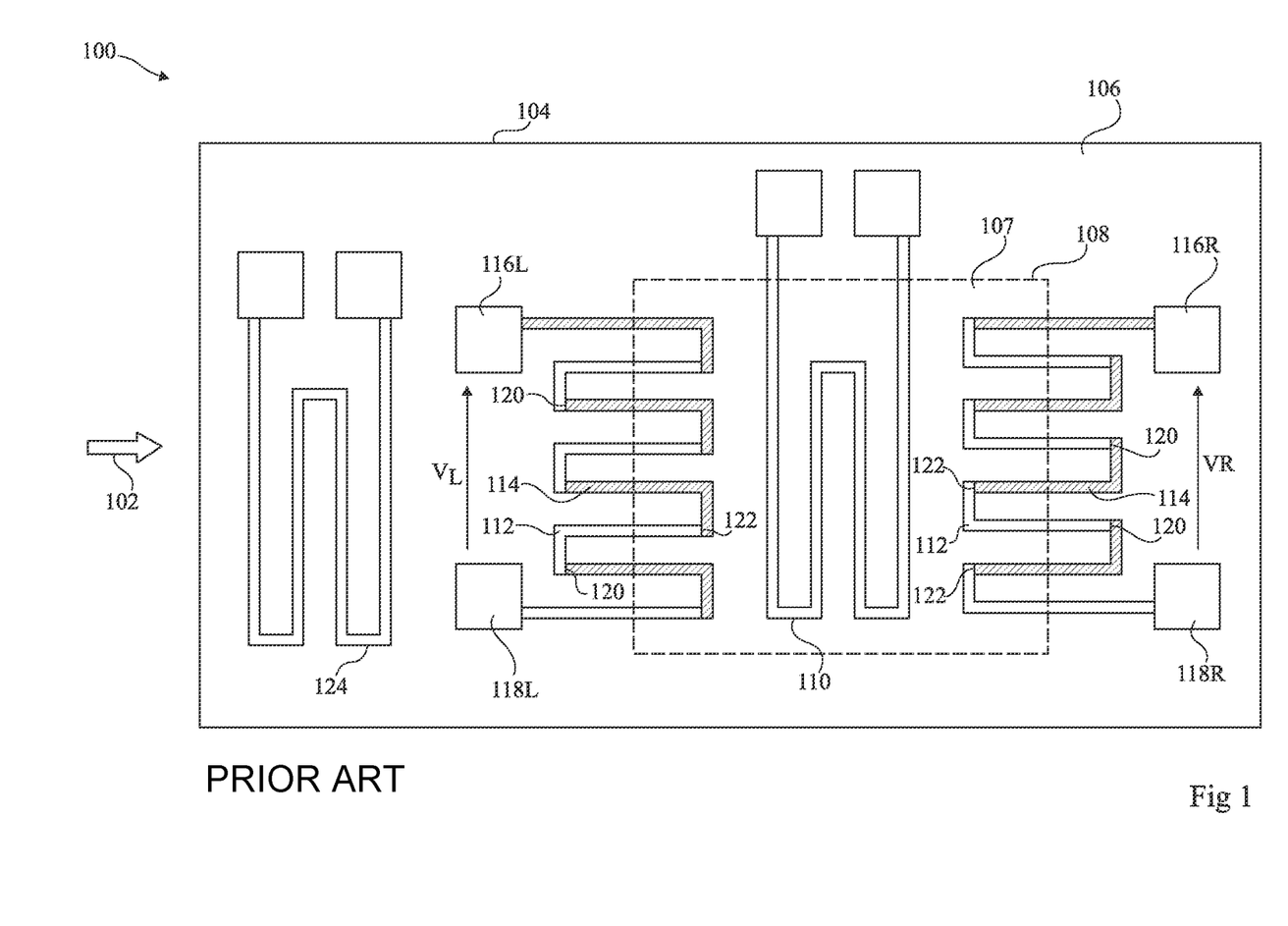
FIG. 1, already described above, represents a device for measuring flow of a fluid.

FIG. 1 corresponds to FIG. 8 of U.S. Pat. No. 6,871,538 and shows a device 100 for measuring the flow of a fluid 102 circulating from left to right.

The device 100 comprises, on a support, for example a silicon substrate 104, an insulating layer 106 forming a membrane 107, delimited in the figure by dotted lines, which covers a cavity 108 formed in the substrate. A heating element 110 is arranged in the central part of the membrane. Two combinations of alternating thermoelectric tracks of aluminium 112 and of silicon 114 connected electrically in series are arranged symmetrically on the right and on the left of the heating element. The junctions between thermoelectric tracks of each combination in series are arranged alternately on the membrane 107 (junctions 122) and on the layer 106 outside of the membrane (junctions 120). The thermoelectric tracks of each combination in series supply a voltage, VR between terminals 116R and 118R, VL between terminals 116L and 118L, resulting from the difference between the temperature of junctions 120 and that of junctions 122. The device 100 further comprises a temperature sensor 124 of the support.

The flow to be measured is obtained based on the difference between the voltages VR and VL supplied by the two series of thermoelectric tracks. The measurement results from a temperature difference between the sides of the membrane. In fact, in the absence of gas flow, the membrane has symmetrical temperatures on the right and on the left of the heating element. A gas flow from left to right creates an asymmetry in the temperatures of the membrane.

Devices for measuring velocity or flow with a heating element, for example of the type of device 100, have the drawback of high energy consumption by the heating element, typically greater than 1 mW and possibly up to 100 mW. Other known types of devices for measuring velocity or flow have various drawbacks, for example moving parts or large overall dimensions that may impede the flow of the gas.

SUMMARY

An embodiment provides for a device for measuring the velocity or flow of gas making it possible to overcome some or all of the drawbacks described above.

An embodiment envisages a device for measuring the velocity or flow of gas that has a particularly low energy consumption.

An embodiment provides a device that is autonomous in terms of energy, for measuring the velocity or flow of gas.

Thus, an embodiment envisages a device for measuring the velocity or flow of a gas at a temperature different from an ambient temperature, comprising: a first platform suspended by first arms above a support suitable for being maintained at the ambient temperature, the first arms comprising thermoelectric tracks configured for supplying a first voltage based on the difference between the temperatures of the first platform and the support; and a processing unit suitable for supplying the measurement of velocity or flow based on the first voltage, the temperature of the gas and the ambient temperature.

According to an embodiment, the device further comprises an ambient temperature sensor.

According to an embodiment, the device further comprises a gas temperature sensor.

According to an embodiment, the device further comprises a second platform suspended by second arms above the support, the second arms comprising thermoelectric tracks configured for supplying a second voltage based on the difference between the temperatures of the second platform and the support, the first and second arms having different thermal resistances and/or the first and second platforms having different dimensions, and the processing unit being suitable for supplying the temperature of the gas based on the first and second voltages.

According to an embodiment, the platforms have the same dimensions, the first arms taken in parallel have a thermal conductance K and the second arms taken in parallel have a thermal conductance K', and the processing unit is suitable for: calculating the temperature Tp of the first platform based on the first voltage and the ambient temperature, and the temperature Tp' of the second platform based on the second voltage and the ambient temperature; and calculating the temperature Tg of the gas satisfying the relationship:

$$Tg = \frac{P * Tp - P' * Tp'}{P - P'},$$

where P and P' satisfy the relationships $$P=K*(Tp-Tamb) \text{ and } P'=K'*(Tp'-Tamb),$$

Tamb being the ambient temperature.

According to an embodiment, for each platform, the arms taken in parallel have a thermal conductance between 1 and 1000 nW/K and the platform has sides of between 5 and 200 μm.

According to an embodiment, the device comprises a plurality of first platforms suspended above the support by arms comprising thermoelectric tracks, the thermoelectric tracks of the various first platforms being connected in series.

According to an embodiment, the processing unit is supplied by a thermoelectric supply device suitable for generating power based on the difference between the temperature of the gas and the ambient temperature.

According to an embodiment, the thermoelectric supply device is a matrix of third platforms suspended above the support by arms comprising thermoelectric tracks, the thermoelectric tracks of the third platforms of one and the same row being connected in parallel and the rows being connected in series.

According to an embodiment, each platform is located above a channel, two arms each comprising a first type of thermoelectric track connecting a side of the platform to one of the edges of the channel, and two arms each comprising a second type of thermoelectric track connecting the opposite side of the platform to the other edge of the channel.

According to an embodiment, the arms comprise electrically insulating strips under the thermoelectric tracks.

According to an embodiment, the thermoelectric tracks are of doped bismuth telluride.

According to an embodiment, the support is arranged in a pipe for circulation of the gas.

BRIEF DESCRIPTION OF THE DRAWINGS

These features and advantages, and others, will be explained in detail in the following non-limitative description of particular embodiments with respect to the attached figures, in which.

DETAILED DESCRIPTION

The same references denote the same elements in the different figures and, moreover, the various figures are not drawn to scale. For the sake of clarity, only the elements useful for understanding the embodiments described are represented and are described in detail.

In the following description, when referring to terms for absolute position, such as the terms "left", "right", etc., reference is made to the orientation of the element in question in the figures in question, it being understood that, in practice, the devices described may be oriented differently. Unless stated otherwise, the term "substantially" means to within 10%, preferably to within 5%.

Figure 2A:
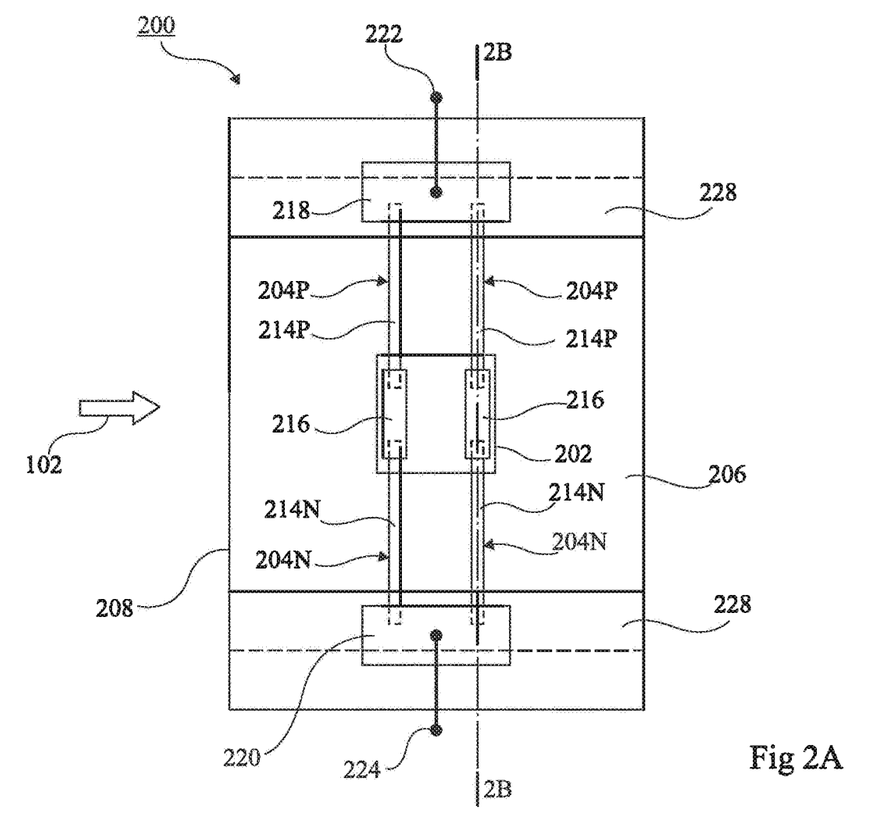
FIGS. 2A and 2B are diagrammatic top and cross section views respectively of an embodiment of a gas velocity sensor.
Figure 2B:
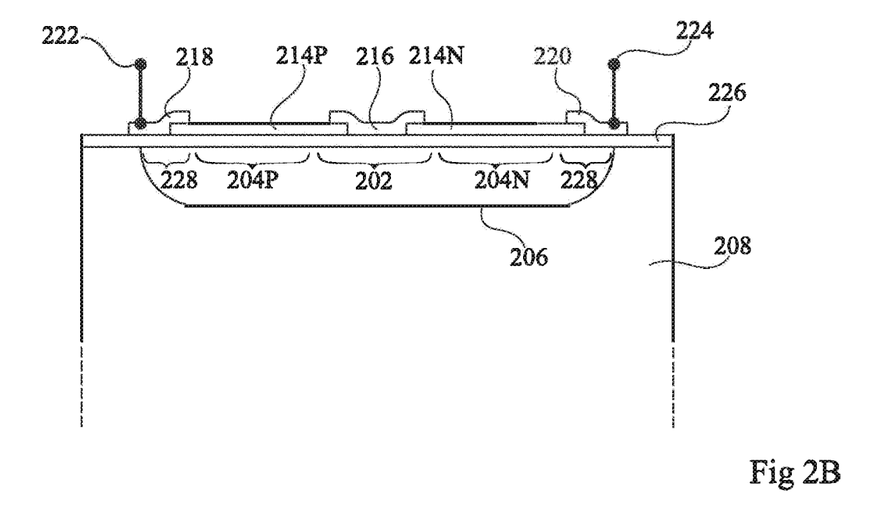

FIGS. 2A and 2B are diagrammatic top and cross section views respectively of an embodiment of a sensor 200 of the velocity of a gas 102. The gas 102 is moving, from left to right in FIG. 2A, and orthogonally to the plane of FIG. 2B. The sensor 200 is intended to be used in a device for measuring velocity or flow, of the type described below with respect to FIG. 3.

The sensor 200 comprises a platform 202, for example rectangular, suspended by arms 204P and 204N above a channel 206 hollowed out in the front face of a substrate 208 for example made of silicon. By way of example, two arms 204P connect a side of the platform to an edge of the channel and two arms 204N connect the opposite side of the platform to the other edge of the channel. The channel 206 extends in the direction of flow of the gas.

Each arm 204P or 204N comprises a thermoelectric track 214P, 214N, for example made of bismuth telluride, doped p-type in arms 204P and n-type in arms 204N. The tracks extend over the platform and over the edges of the channel. Metal islands 216 located on the platform connect the tracks in series, in two pairs 214P-214N. The pairs 214P-214N connect in parallel two metal contacts 218 and 220 connected to terminals 222 and 224 respectively.

The platform 202 is for example a portion of an insulating layer 226 which additionally covers the substrate 208 outside of the channel 206. By way of example, the insulating layer 226 may be of silicon oxide, of silicon nitride or of aluminium oxide. By way of example, in each of the arms, a strip of the insulating layer 226 supports the thermoelectric track of the arm. The channel 206 may extend underneath a portion 228 of the insulating layer near the edges of the channel, depending on the production process used.

In operation, the gas circulates around the platform 202. The substrate is maintained at a temperature different from that of the gas. By way of example, the gas-substrate temperature difference is greater than 0.5° C. For example, the substrate is maintained at the ambient temperature and the gas is at a temperature different from the ambient temperature. A voltage associated with the difference between the temperatures of the platform and of the substrate appears between the terminals 222 and 224. This voltage is associated with the velocity of the gas.

In fact, in the absence of movement of the gas, owing to the thermal conductance of the arms, the temperature of the platform approaches that of the substrate, and the voltage between the terminals 222 and 224 is not significantly different from zero. When the velocity of the gas increases, owing to the heat resistance of the arms, the temperature of the platform moves away from that of the substrate and approaches that of the gas, and the voltage between the terminals 222 and 224 increases.

The heat resistance of the arms and the dimensions of the platform are preferably provided for obtaining an substantially uniform platform temperature. The heat resistance of the arms and the dimensions of the platform are for example provided so that the platform temperature, which is comprised between the temperatures of the substrate and of the gas, is substantially different from the temperature of the substrate and of the gas, for example different by more than 10% of the gas-substrate temperature difference, when the gas velocity is for example between 0.1 and 10 m/s. By way of example, the platform has sides of between 5 and 200 μm. Preferably, the thermal conductance for all of the arms arranged in parallel between the platform and the substrate is between 1 and 1000 nW/K.

By way of example, the arms have a length-to-width ratio comprised between 10 and 50. The width of the arms is for example comprised between 0.5 and 3 μm. The insulating layer 226 has for example a thickness comprised between 50 and 500 nm. The thermoelectric tracks have for example thicknesses comprised between 100 and 300 nm. By way of example, the metal islands 216 and the metal contacts 218 and 220 are made from nickel, palladium or titanium-gold. By way of example, the metal islands 216 and the metal contacts 218 and 220 have a thickness comprised between 50 and 500 nm.

According to one advantage, the platform 202 of the sensor 200 does not have a heating element, in contrast to the membrane 107 of the device 100 in FIG. 1, and accordingly the sensor 200 does not consume any energy.

A quite particular advantage of the sensor 200 results from the fact that it supplies a single voltage originating from the temperature of the platform 202, in contrast to the device 100 in FIG. 1 which supplies two voltages VR and VL originating from different temperatures between two sides of a membrane. The sensor 200 therefore allows particularly accurate measurement, in contrast to the device 100 in FIG. 1, in which the result of the difference between the voltages VR and VL is unable to supply a high enough value for accurate measurement, as very strong heating, typically to temperatures that may be up to 150° C., is necessary in practice in order to obtain a sufficient voltage difference for measurement.

Figure 3:
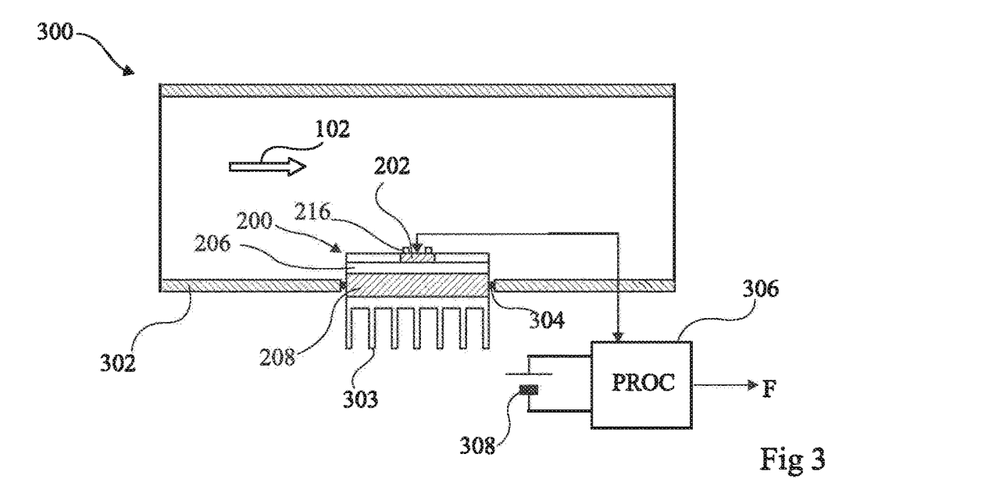
FIG. 3 is a diagrammatic cross section view of an embodiment of a device for measuring flow using the sensor in FIGS. 2A and 2B.

FIG. 3 is a diagrammatic cross section view of an example of device 300 for measuring the flow of a gas 102, using the sensor 200 from FIGS. 2A and 2B.

The device 300 comprises a pipe 302 in which the gas 102 circulates. The sensor 200 is connected thermally to a heat source at the ambient temperature, for example a radiator with fins 303 in contact with the ambient air through an opening 304 made in the wall of the pipe. The pipe 302 is for example intended to be connected to pipework for circulation of the gas by elements that are not shown, such as connectors with a cone or an olive, or flanges. The pipework for example forms part of a complete system such as an industrial system or an air-conditioning system.

The terminals 222 and 224 (not visible in FIG. 3) of the sensor 200 are connected to a processing unit 306 (PROC) supplied by a supply source 308. By way of example, the processing unit comprises a memory and a processor provided for executing a program.

In operation, as mentioned above, the temperature of the gas is different from the ambient temperature. In the example of the device 300, the ambient temperature, the temperature of the gas, as well as the properties of the gas associated with its nature and its pressure, such as its density, its specific heat capacity, its thermal conductivity or its viscosity, are supplied to the processing unit 306 by a user such as, for example, a control unit of the complete system. As a variant, the device 300 may be equipped with additional sensors intended to measure the ambient temperature and/or the temperature of the gas and/or the properties of the gas. An additional sensor of the ambient temperature and/or of the temperature of the gas may be for example a thermistor such as a platinum resistance thermistor, or a thermoelectric device such as a thermocouple sensor. An example of an additional gas temperature sensor will be described below with respect to FIG. 4.

The processing unit supplies a measured value F of the flow of the gas based on the voltage supplied by the sensor 200, the temperature of the gas and the ambient temperature, and based on the properties of the gas. The measured value F may be transmitted to the user by a wired link or by a wireless link.

According to one advantage, because the sensor 200 does not consume any energy, only the power necessary for operation of the processing unit is supplied by the supply source 308. The flow measuring device is thus particularly energy-efficient, for example with a consumption below 100 μW. The device 300 may then be supplied by a battery, and the flow measuring device can operate for several years without replacing the battery.

According to another advantage, owing to the small dimensions of the platform, a variation in gas flow is reflected in a particularly rapid variation in the temperature of the platform. A particularly quick device is obtained, for example capable of detecting a variation in flow in less than 1 s.

According to another advantage, the pressure loss generated by the device is particularly low, because the sensor 200 has particularly small dimensions, and its presence thus does not significantly affect the flow of the gas in the pipe.

Prior to the flow measurement, a calibration phase is preferably carried out. This calibration phase consists of causing a gas of the same nature and at the same pressure as the gas to be measured to circulate in the pipe 302. The gas injected is at a given calibration temperature $Tg0$, different from the ambient temperature $Tamb0$, for example above the ambient temperature. The flow $Fg0$ of the gas is made to vary, and the voltage $Vth0$ supplied by the sensor 200 is measured. The values of the voltage $Vth0$ are thus calibrated as a function of the gas flow $Fg0$ and may be stored in a memory of the processing unit 306.

The flow of the gas can be measured when the temperature of the gas and the ambient temperature are the same as during the calibration phase. For this purpose, the processing unit measures the voltage $Vth$ of the sensor 200, and supplies, as measured value F, the value for which the calibrated value $Vth0$ is equal to the measured value $Vth$. Different calibration temperatures may then be provided for different temperatures of the gas.

The flow of the gas may also be measured when its temperature $Tg$ and the ambient temperature $Tamb$ are different from the temperatures $Tg0$ and $Tamb0$ in the calibration phase. For this purpose, after measuring the voltage $Vth$ supplied by the sensor, the processing unit supplies, as measured value F, the value for which the calibrated voltage value $Vth0$ satisfies the relationship:

$$Vth0 = \frac{Tg0 - Tamb0}{Tg - Tamb} Vth.$$

Gas flows at different temperatures may thus be measured with a single calibration temperature, which simplifies the calibration operation.

Moreover, common calibration may be possible for similar devices, the velocity sensors of which have platforms with the same dimensions and different arms. These sensors have different sensitivities to the velocity of the gas, corresponding for example to different measurement ranges. Calibration is carried out using a sensor the arms of which have a thermal conductance $K0$ optionally different from the thermal conductance K of the arms of the sensor 200. Here the thermal conductance is considered to be represented by the parallel arms between the platform and the substrate. For each value of the flow $Fg0$, the thermal power $P0$ conducted by the arms from the platform to the substrate during calibration is calculated, based on the voltage value $Vth0$, according to the relationship:

$$P0 = K0 \frac{Vth0}{Snp}$$

where $Snp$ is the Seebeck coefficient of the thermocouples 214N-214P. In addition, the temperature $Tp0$ of the platform during calibration is calculated, by the relationship:

$$Tp0 = Vth0 * Snp + Tamb.$$

From this the values $h0$ of the heat exchange coefficient between the platform and the gas are deduced, defined by the relationship:

$$h0 = \frac{P0}{S(Tg0 - Tp0)}.$$

where S is the surface area of the platform. The calibrated values $h0$ of the exchange coefficient as a function of the flow $Fg0$ have thus been obtained. During the flow measurement phase, the voltage $Vth$ supplied by the sensor is measured, and the power P conducted by the arms from the platform to the substrate during measurement is determined, supplied by the relationship:

$$P = K \frac{Vth}{Snp}.$$

The measured temperature Tp of the platform is calculated by the relationship:

$$Tp = Vth*Snp + Tamb.$$

From this the measured heat exchange coefficient h between the platform and the gas is deduced, defined by the relationship:

$$h = \frac{P}{S(Tg - Tp)}.$$

The measured value F of the flow is then the value for which the calibrated value h0 is equal to the measured value h. It is thus possible to measure the flow, because the calibration device and the measurement device have platforms of the same dimensions, and these devices then have heat exchange coefficients between gas and platform considered to be equal. Thus, after a single calibration operation, it is possible to use various devices of the type of device 300, having different measurement ranges and/or different sensitivities.

As a variant, the values h0, instead of being determined by calibration, may be obtained theoretically based on the properties of the gas and the dimensions of the platform. For this purpose, the Prandtl Pr number of the gas is determined. For each flow value Fg0, the velocity of the gas at the level of the platform, then the Reynolds number Re of the gas flow round the platform are determined, and the Nusselt number Nu, which characterizes heat exchange is calculated from the Pr and Re numbers by a correlation known to a person skilled in the art. By way of example, it is possible to use the correlation:

$$Nu = 0.42*Pr^{1/5} + 0.57*Pr^{1/3}Re^{1/2}$$

The value h0 is then deduced conventionally from the number Nu, the dimensions of the platform, and the thermal conductivity of the gas. It is thus possible to measure flows without a calibration operation, in the range of validity of the correlation used, by supplying the values Tg and Tamb to the processing unit.

Figure 4:
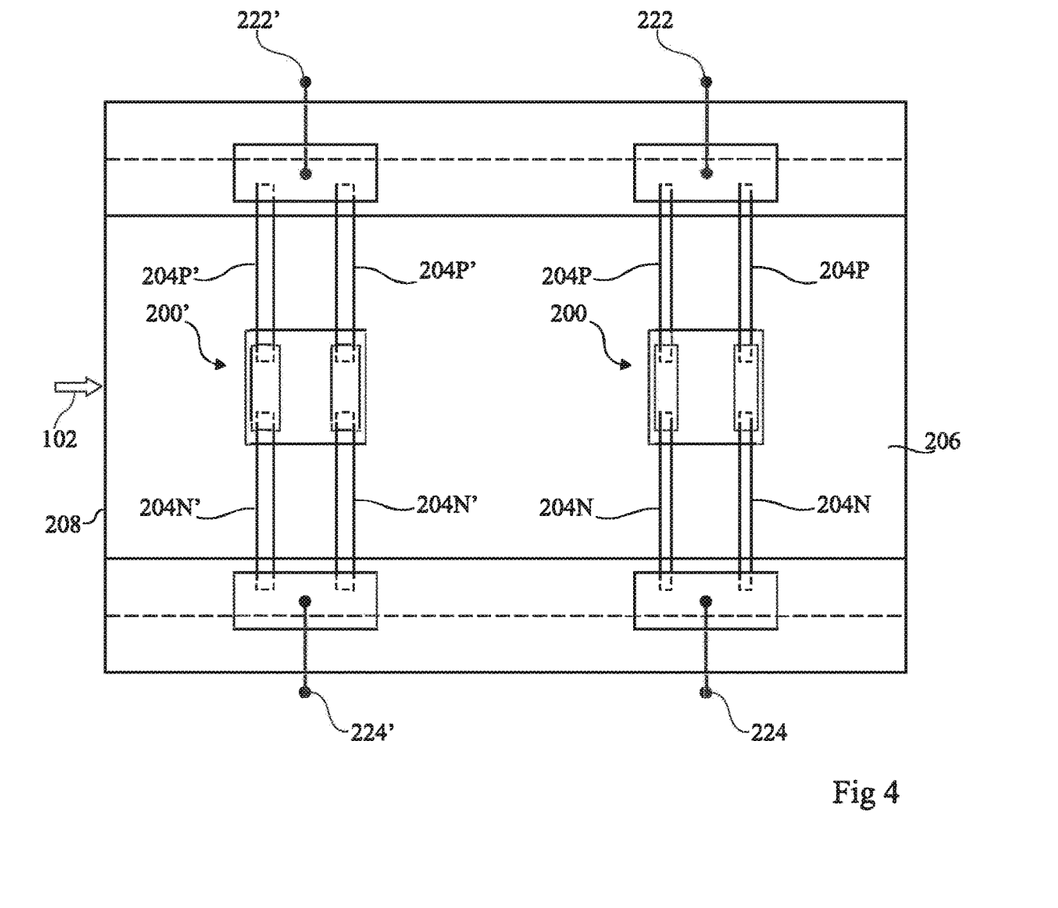
FIG. 4 is a diagrammatic top view of two sensors of the type in FIGS. 2A and 2B.

FIG. 4 is a diagrammatic top view of the sensor 200 in FIGS. 2A and 2B and of an additional sensor 200', with the same structure as the sensor 200. The sensors 200 and 200' are arranged on the same substrate 208 and have their arms and their platforms located above the same channel 206. The sensors 200 and 200' have platforms of the same dimensions. The sensors 200 and 200' differ in the dimensions of their respective arms, 204P, 204N, and 204P', 204N', and the arms of the sensors 200 and 200' thus have different respective thermal conductances K and K'.

The set of sensors 200 and 200' may be used in the device 300 in FIG. 3. Then the terminals 222' and 224' of the sensor 200' are connected to the processing unit 306.

In operation, the sensors 200 and 200' supply, between their terminals 222, 224 and 222', 224', voltages Vth and Vth' that are different on account of the difference in thermal conductance of the arms. The processing unit calculates the temperature Tg of the gas, supplied by the relationship:

$$Tg = \frac{P*Tp - P'*Tp'}{P - P'}$$

where P and P' are thermal powers conducted by the arms and are supplied by the relationships:

$$P = K\frac{Vth}{Snp} \text{ and } P' = K'\frac{Vth'}{Snp'}$$

and Tp and Tp' are platform temperatures supplied by the relationships Tp=Vth*Snp+Tamp and Tp'=Vth'*Snp+Tamb.

The set of sensors 200 and 200' thus constitutes a sensor of the temperature Tg of the gas, autonomous in terms of energy and particularly simple to produce at the same time as the sensor 200.

Figure 5:
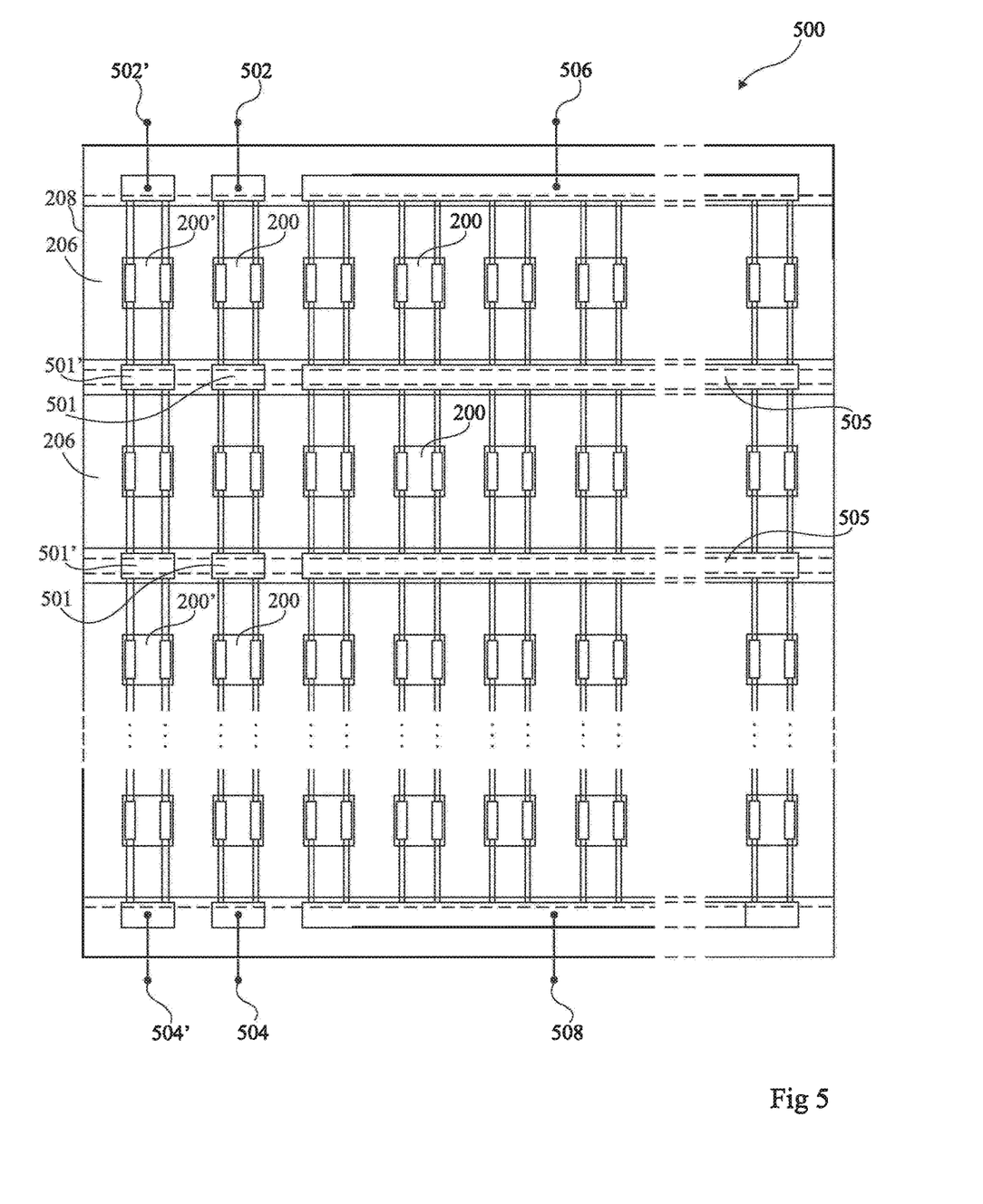
FIG. 5 is a diagrammatic view of a thermoelectric device comprising a matrix of sensors of the type in FIGS. 2A and 2B.

FIG. 5 shows a matrix 500 of sensors of the type of the sensor 200 in FIGS. 2A and 2B, on a common substrate 208. The matrix is intended to be used in a device of the type in FIG. 3 at the location of the sensor 200.

In each row of the matrix 500, the platforms are located above one and the same channel 206 oriented in the direction of the row, and are subjected to the flow of the gas.

The sensors 200' of the first column (on the left) and the sensors 200 of the second column have, like the sensors 200' and 200 in FIG. 4, platforms of the same dimensions and arms with different thermal conductances. The platforms of the first column are connected in series between terminals 502' and 504' by metal contacts 501' common to the adjacent sensors. The platforms of the second column are connected in series between terminals 502 and 504 by metal contacts 501 common to the adjacent sensors.

In the right-hand part of the matrix, the platforms of each row are connected in parallel between metal contacts 505 common to the sensors of the row. The rows are connected in series between terminals 506 and 508, the contacts 505 being common to the adjacent rows.

In a device of the type in FIG. 3, the matrix 500 replaces the sensor 200 and the supply source 308. The terminals 502, 504 and 502', 504' are connected to the processing unit 306. The terminals 506 and 508 are connected to the supply terminals of the processing unit 306.

In operation, the right-hand part of the matrix supplies sufficient power between the terminals 506 and 508 to supply the processing unit, for example power of the order of approximately one hundred μW. In fact, because the rows of the part on the right are in series, the voltages produced are added together, and because the platforms are in parallel in each row, their currents are added together. Furthermore, in the event of failure of an element between the terminals 506 and 508, the power delivered remains sufficient to supply the processing unit, because only one of the sensors is affected by the failure, and the other sensors are sufficient to supply the processing unit.

The processing unit determines the measured value F of the gas flow based on the voltages n*Vth between the terminals 502 and 504 and n*Vth' between the terminals 502' and 504', where n is the number of sensors of the first and second columns. For this purpose, by way of example, the processing unit determines, based on the voltages n*Vth and n*Vth', the voltages Vth and Vth' supplied on average by the respective sensors of the second and first columns, determines the temperature Tg of the gas based on the voltages Vth and Vth' in the manner described with respect to FIG. 4, then determines the flow of the gas based on the average voltage Vth in the manner described with respect to FIG. 3, for example after a phase of calibrating the average voltage Vth as a function of the flow of the gas.

According to one advantage, the flow measuring device thus obtained constitutes its own energy source. Furthermore, the different elements of the matrix 500 are particularly easy to produce simultaneously and to utilize together in the device.

Particular embodiments have been described. Various variants and modifications will become apparent to a person skilled in the art. In particular, although devices for measuring the flow of a gas are described above, similar devices may be obtained for measuring the velocity of a gas, in which the processing unit uses, by way of example, a relationship, obvious to a person skilled in the art, between the flow of the gas and the velocity of the gas round the sensor 200, the sensors 200 and 200' or the matrix 500. As a variant, the pipe 302 may be omitted from the velocity measuring device. In a velocity measuring device, a phase may be provided for calibration of the voltage supplied by the sensor 200 as a function of the velocity of the gas, corresponding to a calibration phase described above with respect to FIG. 3, in which the different flow values Fg0 are replaced with velocity values of the gas.

Sensors 200 and 200' differing in the thermal conductivity of their arms have been described, with respect to FIG. 4. It will be possible to use two sensors which differ in other characteristics, such as for example the dimensions of their platforms. By way of example, during a calibration phase, calibrated values Vth0 and Vth0' of the voltages supplied by the two sensors are obtained as a function of respective gas flows Fg0 and Fg0'. During a measurement phase, the processing unit measures the voltages Vth and Vth'. Based on the values Vth and Vth', it is then possible to determine the temperature of the gas. By way of example, the temperature of the gas is determined among a set of values Tgtest. For each value Tgtest, a value of measured flow, respectively F and F', is determined for each of the two sensors in the manner described with respect to FIG. 3, assuming that the gas is at the temperature Tgtest. The measured temperature of the gas Tg is then the value Tgtest for which the flow values F and F' are equal.

Furthermore, although a calibration phase with the same gas at the same pressure as the gas to be measured has been described above, the device may be calibrated with a gas different from the gas to be measured and/or at a different pressure. In particular, the device may be calibrated with a gas the Prandtl number of which is substantially the same as that of the gas to be measured. For this purpose, the calibrated values Vth0 may be obtained as a function of the Reynolds number of the flow instead of the flow Fg0. The voltage Vth obtained during the measurement phase makes it possible to determine a measured Reynolds number, in a similar manner to that described with respect to FIG. 3 for determining the measured value F. The measured value F is then determined in a known manner from the measured Reynolds number, the properties of the gas and the dimensions of the device.

Although the embodiments described use a velocity sensor of the particular type in FIG. 2, it is possible to use any type of thermoelectric device comprising a platform suspended by arms above a support, the first arms comprising thermoelectric tracks configured for supplying a voltage based on the difference between the temperatures of the first platform and the support. Thus, the platform may comprise more than four arms comprising thermoelectric tracks of alternating types connected in series and forming junctions located successively on the platform and on the substrate.

Moreover, although the sensors described comprise two pairs 214N-214P connected in parallel, the sensors may comprise a single series combination of at least two thermoelectric tracks of alternating types, or more than two such series combinations connected in parallel.

Furthermore, although a particular pair of thermoelectric materials has been described for the thermoelectric tracks, any suitable pair of thermoelectric materials may be used.

Moreover, although, in the sensors described, the platform is located above a channel, the platform may be located above any cavity allowing the platform to be isolated thermally from the substrate.

Furthermore, although the platforms described are rectangular, each platform may have any other shape suitable for being suspended, in particular may comprise one or more openings intended to improve heat exchange between the platform and the gas, and to facilitate the process of producing the cavity under the platform.

Moreover, although the arms described comprise portions of an insulating layer supporting thermoelectric tracks, this portion of insulating layer may be omitted. Although, in the embodiments described, each arm comprises a single thermoelectric track, other embodiments are possible in which arms do not have a thermoelectric track and/or arms comprise several thermoelectric tracks.

Furthermore, although, in the embodiment described with respect to FIG. 5, a particular thermoelectric device supplies the processing unit, for supplying the processing unit it is possible to use any type of thermoelectric device suitable for producing a power supply based on the difference between the temperature of the gas and the ambient temperature. In particular, any series/parallel combination of sensors of the type of the sensor 200 may be used, for example a matrix, the sensors of each column of which are in series, and the columns of which are in parallel.

Various embodiments with various variants have been described above. It should be noted that a person skilled in the art will be able to combine various elements of these various embodiments and variants without displaying an inventive step. In particular, the sensor in FIG. 2 may be replaced with the first or second column of the matrix 500 in FIG. 5, or with a matrix comprising several rows of sensors in parallel connected in series, or with a matrix comprising any series/parallel combination of sensors of the type of sensor 200. The presence of a column makes it possible to increase the voltage supplied and thus improve the signal-to-noise ratio. The presence of several columns makes it possible to increase the robustness of the device in the event of failure of one element of a column.

Furthermore, one and/or another of the sensors in FIG. 4 may be replaced with one of the columns of the matrix 500 in FIG. 5 or with a matrix of sensors.

The invention claimed is:

1. A device for measuring the velocity or flow of a gas at a temperature (Tg) different from an ambient temperature, comprising:
   a first platform suspended by first arms above a support configured for being maintained at the ambient temperature, the first arms comprising thermoelectric tracks configured for supplying a first voltage based on the difference between the temperatures of the first platform and the support; and
   a processing unit configured for supplying the measurement (F) of velocity or flow based on the first voltage, the temperature of the gas and the ambient temperature, said platform being free of any heater.

2. The device according to claim 1, also comprising an ambient temperature sensor.

3. The device according to claim 1, also comprising a gas temperature sensor.

4. The device according to claim 1, also comprising a second platform suspended by second arms above the support;
the second arms comprising thermoelectric tracks configured for supplying a second voltage based on the difference between the temperatures of the second platform and the support;
the first and second arms having different thermal resistances and/or the first and second platforms having different dimensions; and
the processing unit being suitable for supplying the temperature of the gas based on the first and second voltages.

5. The device according to claim 4, in which the platforms have the same dimensions, the first arms have a thermal conductance K and the second arms have a thermal conductance K', and the processing unit is suitable for:
calculating a temperature Tp of the first platform based on the first voltage and the ambient temperature, and a temperature Tp' of the second platform based on the second voltage and the ambient temperature; and
calculating the temperature Tg of the gas satisfying the relationship:

$$Tg = \frac{P*Tp - P'*Tp'}{P - P'},$$

where P and P' satisfy the relationships $P=K*(Tp-Tamb)$ and $P'=K'*(Tp'-Tamb)$, Tamb being the ambient temperature.

6. The device according to claim 1, in which, for the first platform, the first arms have a thermal conductance comprised between 1 and 1000 nW/K and the platform has sides of between 5 and 200 μm.

7. The device according to claim 1, comprising a plurality of first platforms suspended above the support by arms comprising thermoelectric tracks, the thermoelectric tracks of the various first platforms being connected in series.

8. The device according to claim 1, in which the processing unit is supplied by a thermoelectric supply device suitable for generating power based on the difference between the temperature of the gas and the ambient temperature.

9. The device according to claim 8, in which the thermoelectric supply device is a matrix of third platforms suspended above the support by arms comprising thermoelectric tracks, the thermoelectric tracks of the third platforms of a row being connected in parallel and different rows of the matrix being connected in series.

10. The device according to claim 1, in which the first platform is located above a channel, said first arms including two arms each comprising a thermoelectric track of a first type connecting a side of the platform to an edge of the channel, and said first arms further including two arms each comprising a thermoelectric track of a second type connecting an opposite side of the platform to a second edge opposite said edge of the channel.

11. The device according to claim 1, in which the arms comprise electrically insulating strips under the thermoelectric tracks.

12. The device according to claim 1, in which the thermoelectric tracks are made of doped bismuth telluride.

13. The device for measuring flow according to claim 1, in which the support is arranged in a pipe for circulation of the gas.

14. A device for measuring the velocity or flow of a gas at a temperature (Tg) different from an ambient temperature, comprising:
a first platform suspended by first arms above a support suitable for being maintained at the ambient temperature, the first arms comprising thermoelectric tracks configured for supplying a first voltage based on the difference between the temperatures of the first platform and the support; and
a processing unit suitable for supplying the measurement (F) of velocity or flow based on the first voltage, the temperature of the gas and the ambient temperature;
a second platform suspended by second arms above the support;
the second arms comprising thermoelectric tracks configured for supplying a second voltage based on the difference between the temperatures of the second platform and the support;
the first and second arms having different thermal resistances and/or the first and second platforms having different dimensions; and
the processing unit being suitable for supplying the temperature of the gas based on the first and second voltages.

15. The device according to claim 14, in which the platforms have the same dimensions, the first arms have a thermal conductance K and the second arms have a thermal conductance K', and the processing unit is suitable for:
calculating a temperature Tp of the first platform based on the first voltage and the ambient temperature, and a temperature Tp' of the second platform based on the second voltage and the ambient temperature; and
calculating the temperature Tg of the gas satisfying the relationship:

$$Tg = \frac{P*Tp - P'*Tp'}{P - P'},$$

where P and P' satisfy the relationships $P=K*(Tp-Tamb)$ and $P'=K'*(Tp'-Tamb)$, Tamb being the ambient temperature.

16. A device for measuring the velocity or flow of a gas at a temperature (Tg) different from an ambient temperature, comprising:
a first platform suspended by first arms above a support suitable for being maintained at the ambient temperature, the first arms comprising thermoelectric tracks configured for supplying a first voltage based on the difference between the temperatures of the first platform and the support;
a processing unit suitable for supplying the measurement (F) of velocity or flow based on the first voltage, the temperature of the gas and the ambient temperature; and
comprising a plurality of first platforms suspended above the support by arms comprising thermoelectric tracks, the thermoelectric tracks of the various first platforms being connected in series.

* * * * *